(12) United States Patent
Wilson

(10) Patent No.: US 9,464,860 B2
(45) Date of Patent: Oct. 11, 2016

(54) SHOTGUN SIMULATOR

(71) Applicant: Douglas A. Wilson, Wampum, PA (US)

(72) Inventor: Douglas A. Wilson, Wampum, PA (US)

( * ) Notice: Subject to any disclaimer, the term of this patent is extended or adjusted under 35 U.S.C. 154(b) by 134 days.

(21) Appl. No.: 14/534,835

(22) Filed: Nov. 6, 2014

(65) Prior Publication Data
US 2015/0121739 A1    May 7, 2015

Related U.S. Application Data

(60) Provisional application No. 61/900,801, filed on Nov. 6, 2013.

(51) Int. Cl.
*F41A 33/04* (2006.01)

(52) U.S. Cl.
CPC ................... *F41A 33/04* (2013.01)

(58) Field of Classification Search
CPC .................................................... F41A 33/04
USPC ....... 119/719; 89/7; 42/55; 102/355; 434/16, 434/18
See application file for complete search history.

(56) References Cited

U.S. PATENT DOCUMENTS

| | | | |
|---|---|---|---|
| 3,938,272 A * | 2/1976 | Ditto | F41A 1/04 124/56 |
| 4,245,403 A * | 1/1981 | Hipp | F42B 4/24 102/355 |
| 4,365,471 A * | 12/1982 | Adams | F02K 7/02 102/305 |
| 4,664,631 A * | 5/1987 | Pederson | F41A 33/04 434/16 |
| 5,194,006 A | 3/1993 | Zaenglein | |
| 5,281,142 A | 1/1994 | Zaenglein | |
| 5,941,709 A * | 8/1999 | Denchfield | F41A 33/04 434/11 |
| 5,944,502 A * | 8/1999 | Denchfield | F41A 33/04 42/55 |
| 6,192,612 B1 * | 2/2001 | Maier | F41A 1/04 42/54 |
| 6,874,447 B1 | 4/2005 | Kobett | |
| 7,331,310 B1 | 2/2008 | Sersland et al. | |
| 8,758,016 B1 | 6/2014 | Henriksson | |
| 2003/0116100 A1 | 6/2003 | Cullen | |

* cited by examiner

*Primary Examiner* — Reginald Tillman, Jr.
(74) *Attorney, Agent, or Firm* — James R. Williams

(57) ABSTRACT

A shotgun sound simulator comprises an elongated enclosed tube defining a combustion chamber into which an ignitable mixture can be combusted. The tube also includes at least one baffle and an open end having a smaller diameter than the tube. The open end permits ignited gases to escape. By controlling the ratios of the tube diameter (TI), the outlet port diameter (OP), baffle opening diameter (BH), combustion chamber length (CC); and the distance from the combustion chamber to the outlet port (RC), a simulated shotgun sound can be produced upon combustion of a gas in the combustion chamber. Conveniently, the outlet port can be made to receive a training bumper that is launched when the gas is ignited.

18 Claims, 2 Drawing Sheets

SHOTGUN SIMULATOR

The present invention is being submitted as a non-provisional application and claims priority to U.S. 61/900,801 which is incorporated herein by reference.

FIELD OF THE INVENTION

The invention relates to an article that simulates a sound of a shotgun.

BACKGROUND OF THE INVENTION

The sound of a shotgun blast is desired in certain circumstances. For example, in the training of retriever dogs and in retriever dog competitions, at shotgun is fired to simulate an environment and situation found while hunting ducks, geese and other water fowl. A poison with a shotgun is positioned in a field and instructed to discharge the weapon, which is preferably leaded with blank shells. A dummy, of training bumper, can be launched or thrown to simulate a downed water fowl.

The sound of a shotgun blast can be desirable in other situations as well, such as to scare away unwanted animals or water fowl. In either dog training or competition or simply to produce a loud blast, regulations often prohibit the tiring of even blank shells without a specific permit for the person firing the gun or other projectile weapon. This can add to the cost of producing the shotgun blast as well as limiting the availability of properly permitted individuals.

Previous attempts to simulate a shotgun blast without the use of a shell relied on heavy, cumbersome tubes that made portability difficult. Prior art also required extended cycle times on the order of 20-30 seconds before the next "shot" could be fired. Long cycle times precluded training for conditions with consecutive blasts and limit effectiveness when trying to scare unwanted animals. Further, previous attempts to simulate a shotgun blast still required a second person or apparatus to throw or launch a training bumper or dummy. Launchers for training bumpers or dummies typically use a blank shell, do not provide the desired sound, and suffer from substantial recoil on the user. A device that stimulates the sound of a shotgun and is able to launch a training bumper or dummy is desirable.

SUMMARY OF THE INVENTION

The present invention relates to an article for simulating a shotgun blast that is, optionally, simultaneously capable of launching a training bumper. Advantageously, the article does not require the use of either a shotgun or a blank shell, and so would normally not require a permit. The article produces as shotgun blast using an inexpensive fuel and a tube comprising at least one baffle. The tube is tuned to mimic the sound of actual shotgun. Conveniently, the fuel is significantly cheaper than a shotgun blank shell and the cycle time between blasts is comparable to a pump-action shotgun.

The article comprises a tube and an optional igniter. The tube comprises an outer wall that defines an interior, a front end having an open muzzle, and a back end. A baffle and a rear plate within the interior define a combustion chamber. The tube is capable of receiving a gas source. The igniter can regulate the quantity of gas that is allowed to enter the combustion chamber and can produce an ignition spark in the combustion chamber in order to ignite the gas.

In embodiments, the article is further characterized by the tube extending beyond the rear plate to encompass the igniter, whereby the igniter is protected from damage and the use of gas tubing is reduced. The article may also include a handle fixed to the tube, thereby permitting easier portability. The handle is conveniently located above the igniter so that the article can be operated with one hand.

In further embodiments, the article comprises a tube comprising an outer that defines an interior having at least one baffle and a rear plate, a front end having an open muzzle, and a back end. The baffle and rear plate define a combustion chamber. A space is defined by the outer wall, the rear plate and the back end. An igniter is secured into the space. The igniter is capable of receiving a gas supply, directing and regulating the gas to the combustion chamber, and preferably igniting the gas once in the combustion chamber.

The gas can be any gas capable of combustion, such as hydrocarbons. Hydrocarbons includes, but is not limited to, alkanes, alkenes, alkynes and mixtures thereof. Preferably, the gas will comprise mixtures of methylacetylene (propyne) and propadiene, known commercially as MAPP gas. A typical MAPP gas composition can include about 40-50% methylacetylene (propyne), 20-30% propadiene, and 20-35% propane. Alternative compositions can include propyne, propadiene, propylene, propane, isobutane, and butane.

DETAILED DESCRIPTION OF THE INVENTION

Figure 1:
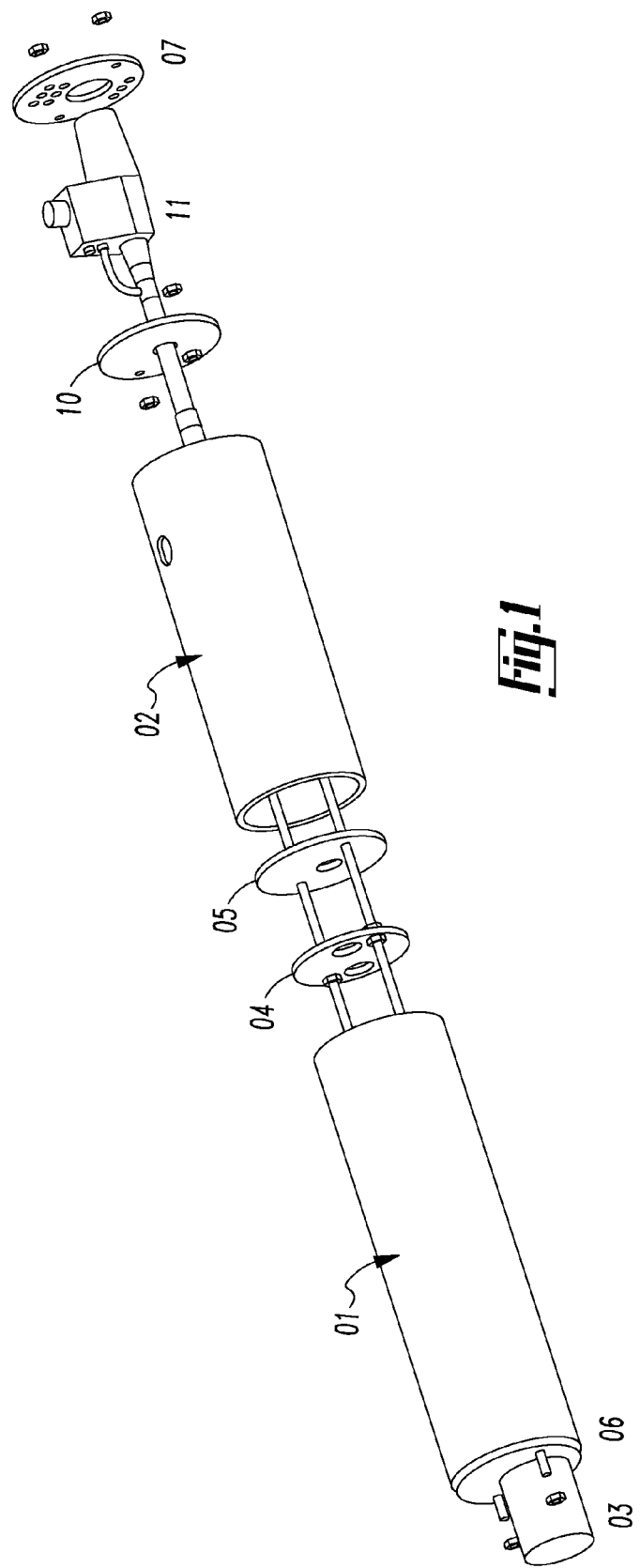
FIG. 1 shows an exploded view of the shotgun simulator
Figure 2:
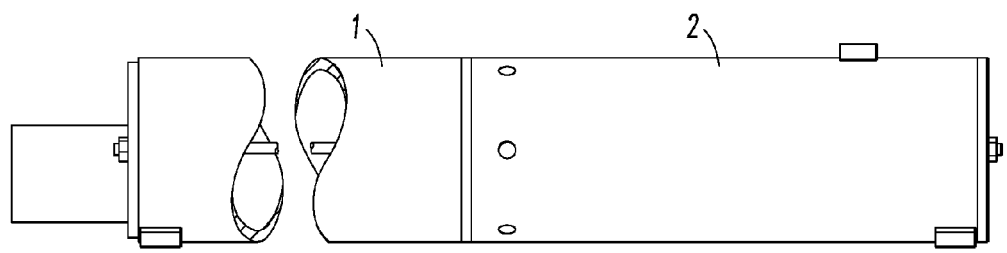
FIG. 2 shows a side view of the assembled shotgun simulator.
Figure 3:
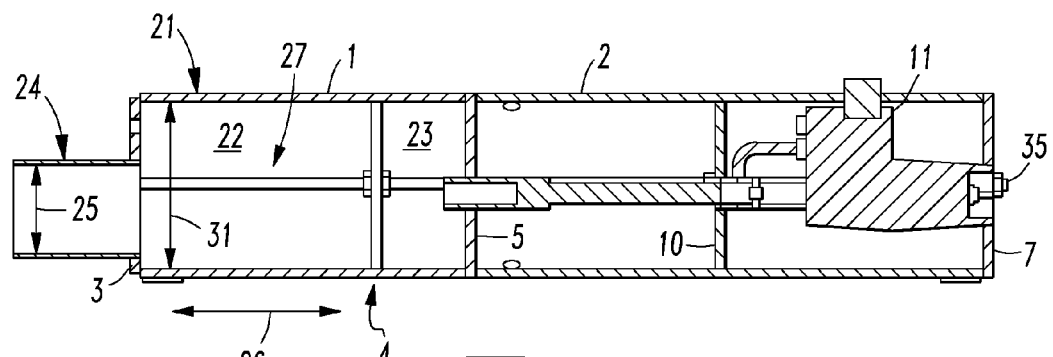
FIG. 3 shows a cutaway view of the shotgun simulator.

FIG. 1 shows an exploded view of an embodiment of the shotgun simulator of the present invention. FIG. 3 shows a cross-sectional view an embodiment of the shotgun simulator. The shotgun simulator comprises at least a forward tube 1 having an outer wall 2 defining an interior 22. Preferably, the shotgun simulator will also include a rearward tube 4. The shotgun simulator comprises a front end 3 and a back end 7, and will have a tube diameter 31. In embodiments, the tube diameter 31 is constant; however, alternative embodiment anticipate a varying diameter.

The interior 22 includes a baffle 4 and a rear plate 5. The outer wall 21, baffle 4 and rear plate 5 define a combustion chamber 23 having a volume equal to the combustion chamber size. The front end 3 may include a muzzle or output port 24 that has a muzzle diameter 25 less than that of the tube diameter 31 so that the muzzle 24 defines a tube reduction. A distance 26 between the baffle 4 and the muzzle 24 defines a resonance chamber 27. The muzzle diameter 25 restricts the flow of ignited gas causing the gas to reverberate inside resonance chamber 27.

The forward tube 1 extends from the rear plate 5 to the front end 3. The rearward tube 2 extends from the rear plate 5 to the back end 7. Conveniently, the rearward tube can define a space that encompasses the igniter 11. In embodiments, an igniter plate 10 separates the igniter from the interior 22 of the shotgun simulator. In various embodiments the forward and rearward tubes 1, 2 can comprise a single piece or may comprise a plurality of pieces.

Figure 4:
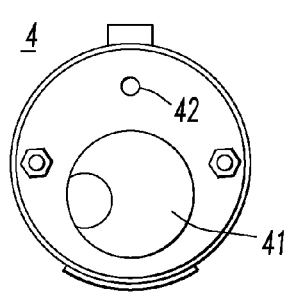
FIG. 4 shows a front view of a baffle.
Figure 5:
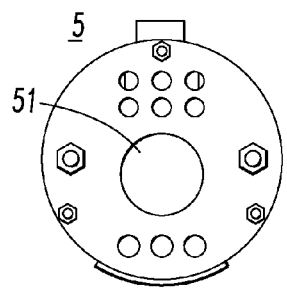
FIG. 5 shows a front view of a back and plate.

FIG. 4 shows an embodiment of the baffle. The baffle 4 will define at least one opening 41 having a baffle opening diameter and preferably will include a plurality of smaller openings 42, that permit propulsion of the ignited gas mixture from the combustion chamber 23 through resonance chamber 25. It is believed that, in the resonance chamber 25, combustion gas velocity increases before it travels through the muzzle 24.

In embodiments, the rear plate 5 is solid but for a gas input 51. Alternatively, the rear plate can include additional openings 52. The openings 41, 42 in the baffle 4 permit the ignited gas to escape the combustion chamber 23 and proceed toward the front end 3. If the shotgun simulator is so equipped, the ignited gas will proceed to the muzzle 24 and be expelled from the interior 22.

The combustion chamber 23, baffle 4, interior 22 of the forward tube 1, and optionally the muzzle 24 combine to produce the sound. The combination of these elements can be tuned to simulate a shotgun blast. Advantageously, the expulsion of gas from the muzzle 24 produces negligible kick-back when compared to an actual shotgun.

Tuning of the shotgun simulator includes adjusting ratios of the combustion tube inner diameter 31 (TI), baffle opening diameter (BH), combustion chamber size (CC), and tube reduction (OC), and the distance 26 between combustion chamber and output port (RC). In an embodiment, a 3.75 inch diameter tube with a 3.48 inch inner diameter, with 2 one-inch diameter baffle holes set at a 4 inch combustion chamber and 2 inch reduction diameter at the end, will produce the appropriate sound. As each of the components are changed the subsequent variables between each would have to change. Knowing the required ratios for the components, one skilled in the art could use the formula to build a simulator with any diameter and length of tube.

The five variables for simulating the sound of a shotgun include:
  a. Tube interior diameter (TI)
  b. Baffle Opening diameter (BH)
  c. Combustion Chamber length (CC)
  d. Output Port muzzle diameter (OP)
  e. Resonance Chamber length (RC)

In an embodiment, these variables will be tuned in order to produce a shotgun-like sound. Tuning includes providing specific ratios between the five variables. The ratios can be about TI=0.07 CC to 2.34 CC=1.41 OP to 4.69 OP=3.21 BH to 10.71 BH=0.31 RC to 1.03 RC. A preferred ratio is about CC=1.149*TI=2*OP=4.5704*BH=0.305RC. Alternatively, when relating the variables to the inner diameter of an actual tube, the ratios can be about TI=0.8703CC=3.977*BH=0.2654*RC. Of course, deviations from these stated ratios are anticipated and are acceptable so long as the sound simulates that of a shotgun.

The tuning of the device to simulate a shotgun blast requires balancing the tube diameter, baffle locations relative to the rear plate, size of the baffle opening, so that a controlled explosion velocity is achieved through the components. The ignited gas reverberates within the tube producing the required sound level and tonality with low recoil. Low recoil is achieved because the present invention, unlike a shotgun, does not rely on compression to produce the required sound.

The igniter 11 is capable of receiving the gas supply 35 and regulating the gas to the combustion chamber. Preferably, the igniter 11 is capable of igniting the gas while the gas is in the combustion chamber. Any type of igniter may be used; however, the igniter will preferably be piezoelectric in order to eliminate the need for batteries or electric power.

The muzzle is constricted relative to the forward tube. Conveniently, the muzzle will include a diameter that permits placing a target bumper at least partially into the tube. When the gas is ignited, the expanding gases will launch the target bumper simultaneously with the simulated shotgun blast.

In prior art bumper throwers, a blank shell is loaded into a cylinder. When the blank fires the combustion is channeled into a very small cylinder causing significant pressure. The compression launches the bumper, but also produces significant recoil. The present invention does not rely on pressure for velocity and sound, will throw a bumper with low recoil.

What is believed to be the best mode of the invention has been described above. However, it will be apparent to those skilled in the art that numerous variations of the type described could be made to the present invention without departing from the spirit of the invention. The scope of the present invention is defined by the broad general meaning of the terms in which the claims are expressed.

The invention claimed is:

1. A shotgun sound simulator comprises a tube comprising:
  a. a front end;
  b. a back end comprising a rear plate;
  c. an outer wall between the front and back end defining an interior having a tube diameter (TI);
  d. a baffle having at least one opening between the front end and back end, the opening having a baffle opening diameter (BH);
  e. a combustion chamber defined by the outer wall, baffle and rear plate, and having a combustion chamber length (CC);
  f a resonance chamber defined by the front end, baffle and outer wall, and having a resonance chamber length (RC);
  g. a muzzle at the front end, the muzzle having a muzzle diameter (OP) less than the tube diameter.
  whereby igniting a gas in the combustion chamber causes the gas to expand through the opening of the baffle into the resonance chamber and then through the muzzle;
  and wherein the tube diameter (TI), baffle opening diameter (BH), combustion chamber length (CC), resonance chamber length (RC), and muzzle diameter (OP) are tuned to simulate a shotgun blast by providing a ratio of TI=0.07 CC to 2.34 CC=1.41 OP to 4.69 OP=3.21 BH to 10.71 BH=0.31 RC to 1.03 RC.

2. The article of claim 1, wherein the shotgun sound simulator is capable of receiving a gas source and comprises an igniter that regulates the quantity of gas entering the combustion chamber from the gas source and produces an ignition spark in the combustion chamber in order to ignite the gas within the combustion chamber.

3. The article of claim 1, wherein a space is defined by the outer wall, the rear plate and the back end, and the space contains the igniter.

4. The article of claim 1, wherein the gas is selected from a group consisting of an alkane, alkene, alkyne and mixtures thereof.

5. The article of claim 4, wherein the gas comprise mixtures of methylacetylene (propyne) and propadiene.

6. The article of claim 5, wherein the gas comprises 40-50% methylacetylene (propyne), 20-30% propadiene, and 20-35% propane.

7. The article of claim 1, wherein tuning includes a ratio of about $CC=1.149*TI=2*OP=4.5704*BH=0.305*RC$.

8. A shotgun sound simulator comprises:
   a. a forward tube comprising an outer wall having a tube diameter (TI) and defining an interior, the forward tube extending from a rear plate to a front end defining an output port having a diameter (OP) less than the tube diameter;
   b. a baffle within the interior, the baffle having at least one opening with a baffle opening diameter (BH), the baffle, forward tube and rear plate defining a combustion chamber having a combustion chamber length (CC), where the output port is separated from the combustion chamber by a distance (RC); and
   c. a ratio of TI=0.07 CC to 2.34 CC=1.41 OP to 4.69 OP=3.21 BH to 10.71 BH=0.31 RC to 1.03 RC, whereby igniting a combustible gas in the combustion chamber simulates a shotgun sound.

9. The article of claim 8, wherein the baffle defines a plurality of openings that permit propulsion of the ignited gas mixture from the combustion chamber through resonance chamber.

10. The article of claim 8, wherein the front end includes a muzzle defining the output port.

11. The article of claim 10, wherein the muzzle permits placing a target bumper at least partially into the forward tube.

12. The article of claim 10, wherein the ratio is TI=0.07 CC to 2.34 CC=1.41 OP to 4.69 OP=3.21 BH to 10.71 BH=0.31 RC to 1.03 RC.

13. The article of claim 8, wherein the shotgun sound simulator is capable of receiving a gas source and comprises an igniter that regulates the quantity of gas entering the combustion chamber from the gas source and produces an ignition spark in the combustion chamber in order to ignite the gas within the combustion chamber.

14. The article of claim 8, wherein the combustible gas is selected from a group consisting of an alkane, alkene, alkyne and mixtures thereof.

15. A shotgun sound simulator comprises:
   a. a tube having a tube diameter (TI) and comprising an outer wall, a front end having an outlet port having a diameter (OP) less than the tube diameter;
   b. a back end comprising a rear plate;
   c. a baffle between the rear plate and the front end, the baffle defining at least one opening with an opening diameter (BH);
   d. the outer wall, baffle and rear plate defining a combustion chamber having a length (CC);
   e. the outer wall, baffle and front end defining a resonance chamber that separates the combustion chamber from the outlet port by a distance (RC); and
   f. a ratio of TI=0.07 CC to 2.34 CC=1.41 OP to 4.69 OP=3.21 BH to 10.71 BH=0.31 RC to 1.03 RC;
   whereby igniting a gas in the combustion chamber simulates a shotgun sound.

16. The article of claim 15, wherein the ratio is $CC=1.149*TI=2*OP=4.5704*BH=0.305*RC$.

17. The article of claim 15, wherein the shotgun sound simulator is capable of receiving a gas source and comprises an igniter that regulates the quantity of gas entering the combustion chamber from the gas source and produces an ignition spark in the combustion chamber in order to ignite the gas within the combustion chamber.

18. The article of claim 17, wherein a space is defined by the outer wall, the rear plate and the back end, and the space contains the igniter.

* * * * *